United States Patent [19]

Dahneke et al.

[11] Patent Number: 4,519,061
[45] Date of Patent: May 21, 1985

[54] SEALED OPTICAL DISK UNIT, APPARATUS AND METHOD FOR DEBRIS-SUPPRESSED RECORDING

[75] Inventors: Barton E. Dahneke, Palmyra; Alan B. Marchant, Rochester, both of N.Y.

[73] Assignee: Eastman Kodak Company, Rochester, N.Y.

[21] Appl. No.: 508,225

[22] Filed: Jun. 27, 1983

[51] Int. Cl.³ .................................................. G11B 7/24
[52] U.S. Cl. ...................................... 369/109; 346/76 L; 369/72; 369/284; 369/292
[58] Field of Search ............... 369/109, 111, 100, 284, 369/285, 292, 72, 73, 275; 346/76 L, 137

[56] References Cited

U.S. PATENT DOCUMENTS

| | | | |
|---|---|---|---|
| 3,837,656 | 9/1974 | Pradervand | 369/72 |
| 4,074,282 | 2/1978 | Balas, Jr. et al. | 346/135 |
| 4,336,545 | 6/1982 | Howe et al. | 346/1.1 |
| 4,360,908 | 11/1982 | Howe et al. | 369/109 |
| 4,365,258 | 12/1982 | Geyer et al. | 346/137 |

Primary Examiner—Donald McElheny, Jr.
Attorney, Agent, or Firm—Warren W. Kurz

[57] ABSTRACT

Debris suppression is effected in a sealed disk unit, of the kind having a generally enclosed record element/cover sheet inter-space, by controlling the temperature gradient across the inter-space so that thermophoretic forces, exerted by air molecules, drive ablative debris particles toward the cover sheet.

19 Claims, 8 Drawing Figures

SEALED OPTICAL DISK UNIT, APPARATUS AND METHOD FOR DEBRIS-SUPPRESSED RECORDING

BACKGROUND OF THE INVENTION

1. Field of the Invention

The present invention relates to optical disk systems of the kind adapted for optically writing and reading high density information and more particularly to improvements in write/read apparatus, methods and disk unit constructions, which ameliorate adverse effects of recording debris.

2. Description of the Prior Art

One popular type of optical disk comprises a record layer of thermally ablatable material formed on a disk support. Information is recorded by modulating a tightly focused laser beam to form pits along tracks on such a disk while it is rotating. The pits can be extremely small (e.g. on the order of a micron) in size; therefore they are susceptible to damage by contact and obscurement by dust particles. To avoid these problems many disk unit constructions include a protective cover over the record layer.

U.S Pat. Nos. 4,074,282 and 4,365,258 disclose disk units wherein the protective cover is a disk-shaped cover sheet supported around its outer periphery in spaced relation to the disk record element so as to provide a sealed disk unit having an enclosed, dust-free air space above the record layer. Such sealed disk units offer advantages from several viewpoints; however, we have found that, in certain such disk unit embodiments, decreases in writing sensitivity and reading fidelity can occur because of debris from the ablative pit-forming events.

Specifically, we have found that in sealed disk units, certain dye/binder recording layers, e.g. some of the embodiments disclosed in U.S. Pat. Nos. 4,336,545 and 4,360,908, form ablative debris, which coagulates into particles as large as a micron in size. When such large debris particles deposit on a record portion of the disk unit they can cause a decrease in signal-to-noise ratio and a significant increase in the error rate.

SUMMARY OF THE INVENTION

An important purpose of the present invention is to provide optical disk write/read apparatus, systems and methods which reduce debris-associated fidelity losses in sealed disk units of the kind described above. A related purpose of the present invention is to provide improved disk unit constructions and cooperative apparatus, systems and methods which prevent the formation of objectionable-sized debris particles and/or the deposition of such debris particles on the record surface of sealed disk units.

In one aspect the present invention provides an optical disk apparatus especially adapted for use with sealed disk units and including turntable means for receiving and rotating such disk units; means for writing and reading ablated markings on the record portion of a received disk; and means for adjusting the temperature of the record element or the cover sheet of a received disk unit so that thermophoretic forces, exerted by air or other gas in its enclosed space, drive ablative debris particles toward the cover sheet. In another aspect the present invention provides an improved method for recording with sealed disk units which includes controlling the temperature of at least one of the unit's cover sheet and record element to effect such a thermophoretic, particle-driving force. In a further aspect the present invention provides a cooperative system (disk unit and write/read apparatus) in which the disk unit's air space temperature gradient is controlled to avoid deposition of visible debris on the system's record element. In other aspects the present invention provides disk units especially adapted for use in the apparatus and methods such as described above.

BRIEF DESCRIPTION OF THE DRAWINGS

The subsequent description of preferred embodiments of the present invention refers to the attached drawings wherein.

DETAILED DESCRIPTION OF THE PREFERRED EMBODIMENTS

Figure 1:
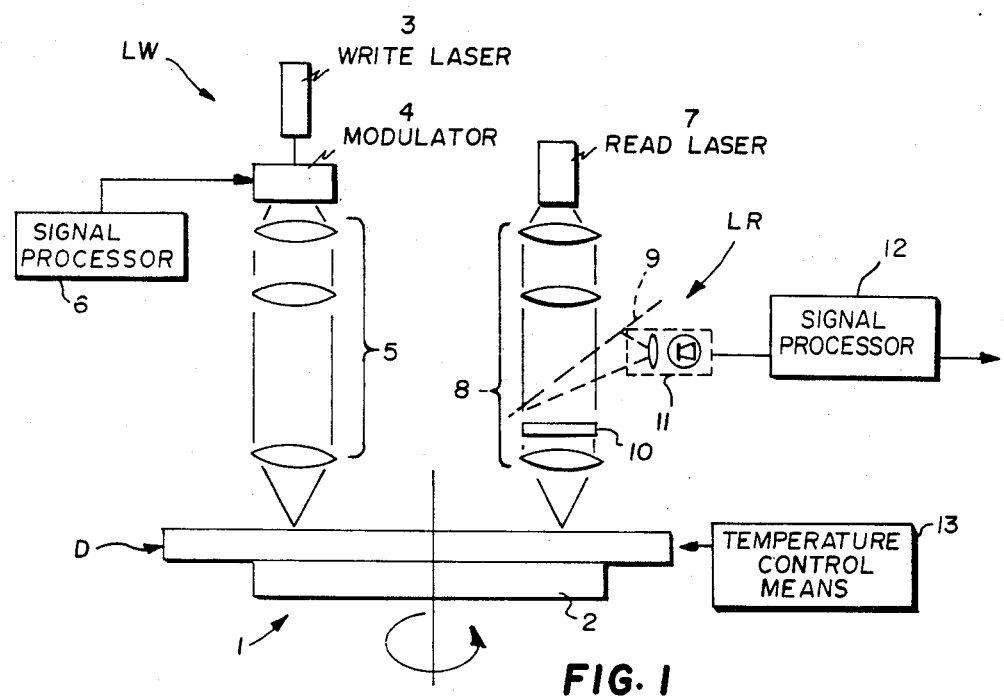
FIG. 1 is a schematic illustration of one embodiment of optical disk write/read apparatus employing the present invention.

The present invention is useful with a wide variety of optical disk write/read apparatus which utilize sealed optical disk units as a component of the write/read system. FIG. 1 shows one such system schematically. The apparatus 1 in general comprises a laser writing subsystem LW, a laser reading subsystem LR and a turntable 2 for rotating a disk unit D. The subassemblies LW and LR are shown diametrically opposite only for ease of illustration; however, it will usually be preferable to provide such subassemblies more nearly side-by-side for common coarse radial indexing relative to tracks of the disk unit D. Also, each of the subassemblies desirably will have tracking and focus servo-systems of a type known in the art, so that the actual location of optical elements will usually vary from that shown in the FIG. 1 diagram. Moreover, a single optical assembly can be used for simultaneous writing and reading if the writing and reading light beams are directed so that the single focusing lens can focus both light beams in the same general vicinity on the record element.

The subassembly LW can comprise a writing laser 3 of a first wavelength, a light modulator 4, such as an acoustic cell, and a series of light-refractive elements 5 which provide a tightly focused beam at the record surface of the recording layer of disk unit D. A signal processor 6 addresses the modulator 4 to turn the beam on and off in accord with the encoded pit generating signal.

The reading subassembly LR comprises a read laser 7 of a second wavelength and focusing optics 8 which provide a read spot that extends at least across the tracks of the disk.

Desirably a polarizing beam splitter 9 and a quarter wave plate 10 are provided so that read light reflected from the disk surface will be directed back through a portion of the focusing optics 8 to photodetector means 11. Detection means 11 can be of push-pull (or split detector) type such as described in U.S. Pat. No. 4,065,786 in which case the desired phase shift would be in the order of one-quarter of the read wavelength. Alternatively detection means can be of the central aperture type which is also discussed in U.S. Pat. No. 4,065,786, in which case the desired phase shift would be in the order of one-half wavelength. A discussion of split field and central aperture detection systems is also set forth in an article entitled "Simplified Diffraction Theory of the Video Disk" by A. Korpel at page 2037 *Applied Optics*, July 1978 (Vol. 17, No. 13). In either mode, the detected signal is output to signal processing means 12 for decoding.

In operation the disk unit D is rotated by platen 2 to effect scanning motion relative to the modulated beam from writing laser 3 along its tracks, thus forming alternating pitted and non-pitted track portions. Similarly the rotation of the disk relative to the beam from reading laser 7 effects scanning motion between the tracks and the beam to produce a modulated light signal to detector 11. In accord with the present invention, temperature control means 13 are provided for causing a predetermined temperature gradient across the air space between the record element and cover sheet of sealed disk units D. The purpose of such temperature control is to suppress the formation on the record element of ablative debris particles which are of size that impairs the system's write/read performance.

Figure 2:
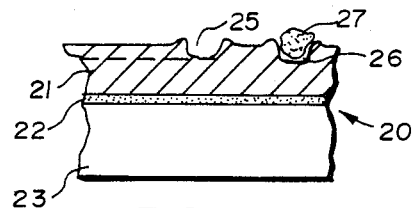
FIG. 2 is a highly enlarged cross-sectional view illustrating a record portion of an optical disk unit.

The portion of the disk record element 20 shown in FIG. 2 illustrates one adverse effect of large ablative debris particles. Element 20 comprises an ablative recording layer 21 (e.g. a dye/binder layer) overlying a reflective layer 22 on a support 23. During writing operation heat generated by absorption of the write laser beam causes the ablation of pits such as 25 and 26 in the recording layer 21. It appears that in writing operations with ablative material in a generally sealed environment (such as in seal disk units), the cloud of minute particles (<< 1 micron) created in a pit-forming event can coagulate to form much larger sized debris such as particle 27 shown in FIG. 2. In reading operations these larger debris particles can obscure the sharply defined pit outline and cause readout errors. Also, in some instances, the existence of such large debris on the surface of the record layer 21 can cause a reduction of the signal-to-noise ratio for the system. Further, the particles can fall on yet-to-be-recorded portions of the record layer and cause inaccuracies in subsequent writing operations.

To avoid, or at least significantly reduce, the debris-related problems described above, we have devised approaches for controlling the temperature gradient across the space between the cover sheet and record element in sealed disk units, i.e. across the record element/cover sheet inter-space. More particularly, we have found that if the record element surface is at a sufficiently greater temperature than the cover sheet the minute debris particles blasted into the inter-space will experience a thermophoretic force which pushes them to the cover sheet. This force is provided by the temperature differential and the resulting non-homogeneous momentum distribution of air (or other gas) molecules across the cover sheet/record element inter-space. Such thermophoretic forces dominate gravity, van der Walls and electrostatic forces for conditions applicable to sealed disk unit write/read operations, and thus cause the particles to deposit on the cover sheet rather than upon the record element. Often the controlled migration will prevent particle coagulation; however, even if coagulation occurs, larger debris particles on the cover sheet are out of the write/read lens depth of focus and cause no problem.

Figure 3:
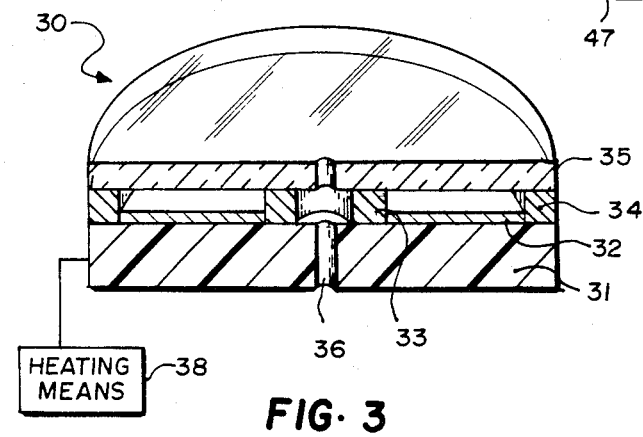

FIG. 3 illustrates one form of sealed disk unit 30 with which the present invention is useful and schematically shows one preferred general mode of temperature control, viz. adjusting the record element temperature by heating means 38. Disk unit 30 has a record element comprising an aluminum disk support 31 and an ablatable record layer 32 (e.g. vapor deposited bismuth) formed thereon. Inner and outer spacer rings 33 and 34 space a transparent plastic disk cover sheet 35 above the record surface of the record element. A central spindle hole can be provided to center the disk unit on a turntable. The heating means 38 of the write/read apparatus is adapted to heat the record layer 32 by heat conduction through substrate 31. Cover sheet 35 will remain substantially at ambient temperature via thermal convection and conduction with surrounding ambient gas.

Figure 4:
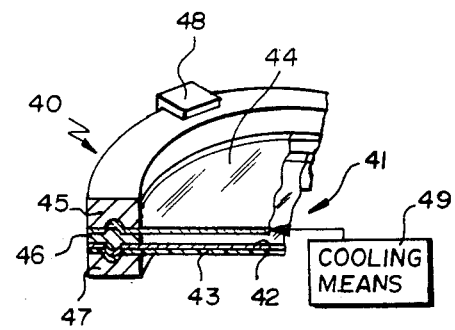
FIGS. 3 and 4 are cross-sectional views of exemplary sealed disk units employing different embodiments of the invention.

FIG. 4 shows another form of sealed disk unit 40 which has a record element 41 comprising a dye/binder record layer 42 coated on a reflectively surfaced flexible film support 43. A flexible, transparent cover sheet 44 is supported in a tensioned, spaced position over the record element by annular spacing and tensioning rings 45, 46, 47, which can also tension the record element. The rings are held in interfitting relation, e.g. by clamp 48, to retain and substantially enclose the space between the record element 41 and cover sheet 43. In this embodiment cooling means 49 for cover sheet 44 are provided in the cooperative write/read apparatus (while the record element 41 remains at ambient temperature) to effect the desired temperature differential across the enclosed record element/cover sheet air space. If desired, the cooling of a cover sheet can be employed in conjunction with heating of the record element as described with respect to FIG. 3.

Before describing the details of exemplary preferred embodiments for heating record elements and/or cooling cover sheets, some guideline parameters as to the magnitude of such heating or cooling will be helpful. In general, preferred effects are obtained in accord with the present invention if the temperature gradient across the record element/cover sheet inter-space is equal to or greater than about 50° C./mm. Using this guideline, for a typical record element/cover sheet spacing of about 0.25 mm, a temperature differential of about 12.5° C. between a record layer surface and the inner surface of the cover sheet during ablative recording will provide useful debris suppression. For smaller spacings, lesser temperature differentials are useful.

Figure 5:
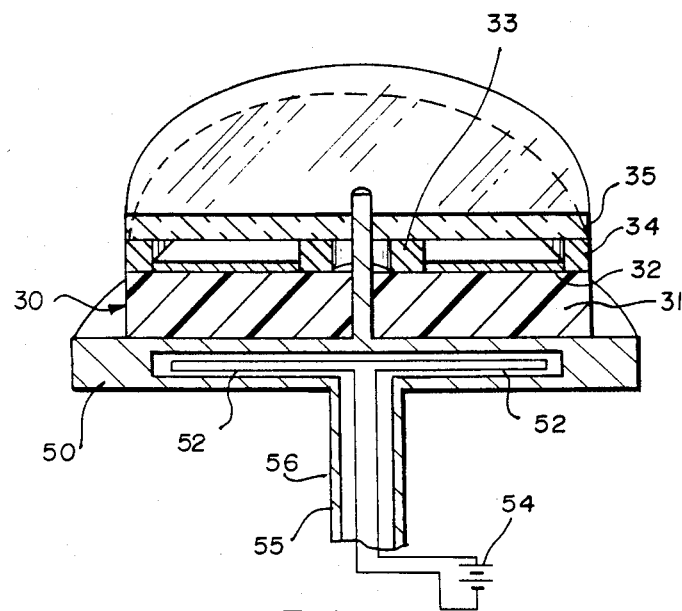
FIGS. 5, 6 and 7 are cross-sectional views illustrating preferred embodiments for heating a disk unit's record element to effect temperature control in accord with the present invention.

FIG. 5 discloses one preferred structure and mode for heating a disk unit's record element to achieve the desired temperature control. This approach is particularly useful e.g. with a disk unit such as unit 30 shown in FIG. 3. Temperature control is effected by heating the turntable 50 to provide heat by conduction through metal support 31, to the record surface 32. In the illustrated embodiment heating coils 52 in the turntable are coupled to a power source 54 to provide this effect.

Figure 6:
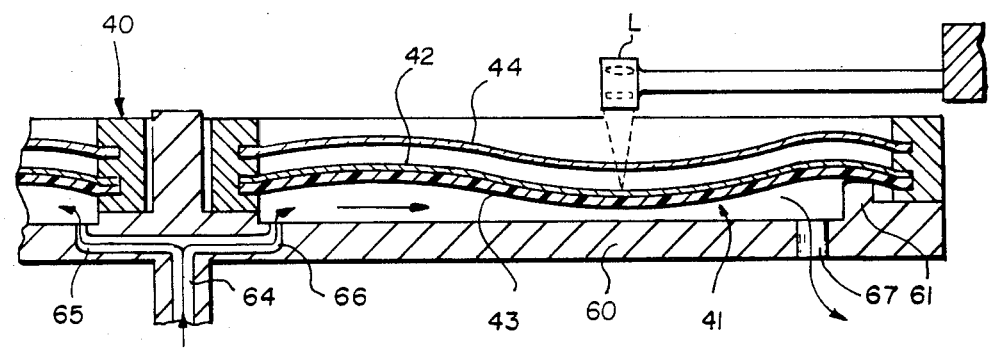

FIG. 6 shows another preferred structure and mode for heating a sealed disk unit similar to unit 40 of FIG.

4. In this embodiment the turntable 60 is formed having an abutment ring 61 which tensions and positions record element 41, and an air space is formed between portions of the turntable and support 43 of the record element. Heating of the record element is achieved by means which supply hot gas through turntable passages 64, 65, 66. The gas passes below the record element and exits at aperture 67. Besides heating the surface of the record element the gas can be used to control position of the record element as described in U.S. patent application Ser. No. 474,397, filed Mar. 8, 1983 in the name of A. B. Marchant.

Figure 7:
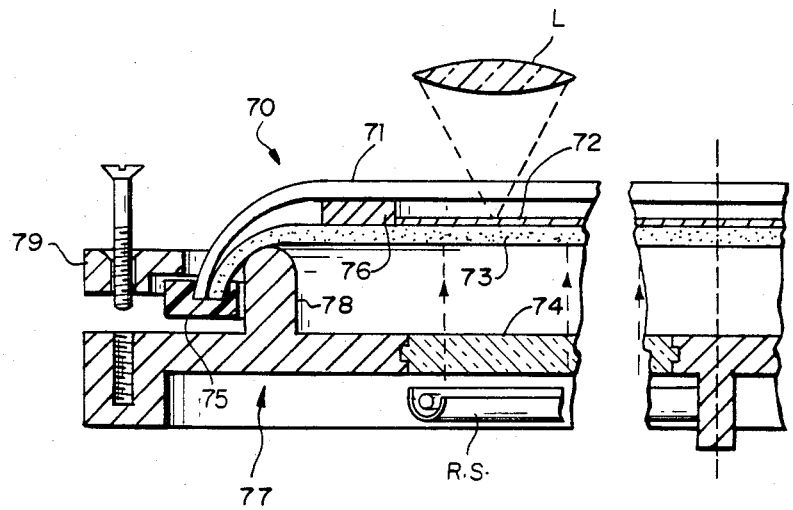

FIG. 7 discloses another preferred write/read system in accord with the present invention. In this embodiment the sealed disk unit 70 comprises a transparent cover sheet 71 and a record element that includes a support 73 and recording layer 72. The record disk and cover sheet are edge-retained by ring 75 and spaced by spacer ring 76. The turntable 77 has an annular abutment surface 78 for positioning and tensioning the record element 73 when the unit is secured to the turntable 77 e.g. by clamp means 79. In this embodiment a portion 74 of the turntable is transparent with respect to radiation from a source R.S., which is located to direct radiation, e.g. infrared radiation, through the turntable portion 74 onto support 73. The support is designed to be highly absorptive (e.g. loaded with carbon particles) with respect to the source R.S. The heat absorbed by the support is transmitted to the record layer to an extent achieving the desired temperature differential but not causing deformation of the record layer. This embodiment of the invention can provide the further advantage of reducing the record energy focused by lens L. In another preferred embodiment, similar to the FIG. 7 embodiment, a radiation source such as R.S. is located above the turntable at a location displaced circumferentially from the write/read lens. The spectral content of the radiation source is selected to be transparent to the cover sheet 71 and absorbed by recording layer 72 so as to create the desired temperature gradient.

Figure 8:
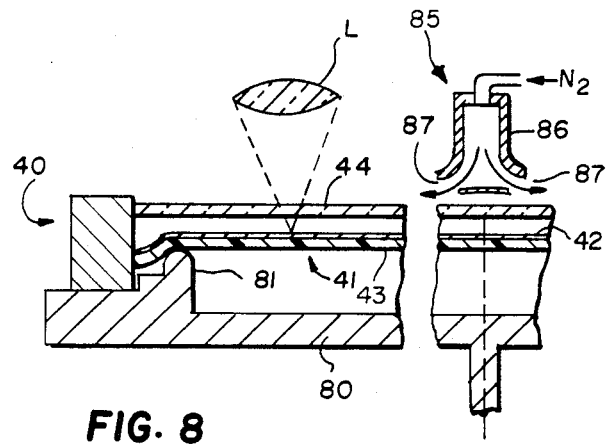
FIG. 8 is a cross-sectional view illustrating a preferred embodiment for cooling a disk unit's cover sheet to effect temperature control in accord with the present invention.

FIG. 8 illustrates one preferred embodiment for effecting the present invention by cooling the cover sheet. The disk unit shown in FIG. 8 is like unit 40 of FIG. 4 and supported on turntable 80 with the abutment surface 81 positioning the record element 41 of the disk unit. The temperature control means in this embodiment comprises cooling means 85 in the form of a source of cold gas, e.g. nitrogen, which is introduced under pressure to a manifold 86 and directed by nozzles 87 to flow radially outwardly during disk rotation across the upper surface of the cover sheet 44. Alternatively a slow stream of cold gas may be introduced against a central cover sheet portion without nozzles, allowing centrifugal forces to move the cold gas radially outwardly. In either mode the cold gas preferably is injected into a laminar layer with about 1 mm of the cover sheet upper surface so that it flows outwardly without substantial mixing with the atmosphere surrounding the disk unit.

The invention has been described in detail with particular reference to preferred embodiments thereof, but it will be understood that variations and modifications can be effected within the spirit and scope of the invention.

What is claimed is:

1. An optical disk write/read apparatus of the kind adapted for use with a disk unit including: (i) a record element having an ablatable record portion and (ii) a cover sheet mounted in spaced relation to the record portion in a manner forming a generally enclosed space between the record element and cover sheet, said apparatus comprising:
    (a) turntable means for receiving and rotating such disk unit;
    (b) means for writing and/or reading ablated markings on the record portion of a received disk unit; and
    (c) means for controlling the temperature of the record element or the cover sheet of a received disk unit so that thermophoretic forces exerted by gas in its enclosed space drive ablative debris particles toward the cover sheet.

2. The invention defined in claim 1 wherein said temperature controlling means provides a temperature gradient of at least about 50° C./mm across such disk unit's cover sheet/record element inter-space.

3. The invention defined in claim 2 wherein said temperature controlling means includes means for heating the record element of such disk unit.

4. The invention defined in claim 2 wherein said temperature controlling means includes means for cooling the cover sheet of such disk unit.

5. The invention defined in claim 1 wherein said temperature controlling means includes means for heating the record element of such disk unit.

6. The invention defined in claim 1 wherein said temperature controlling means includes means for cooling the cover sheet of such disk unit.

7. An optical disk write/read system comprising:
    (a) an optical disk unit including (i) a record element having an ablatable record portion and (ii) a cover sheet mounted in spaced relation to the record portion in a manner forming a generally enclosed space between the record element and cover sheet;
    (b) means for rotating said disk unit;
    (c) means for writing and/or reading ablated markings on the record portion of said disk unit; and
    (d) means for controlling the temperature of the record element and/or the cover sheet of said disk unit so that thermophoretic forces exerted by gas in its enclosed space drive ablative debris particles toward the cover sheet.

8. The invention defined in claim 7 wherein said temperature controlling means provides a temperature gradient of at least about 50° C./mm across said disk unit's cover sheet/record element inter-space.

9. The invention defined in claim 8 wherein said temperature controlling means includes means for heating the record element of said disk unit.

10. The invention defined in claim 8 wherein said temperature controlling means includes means for cooling the cover sheet of said disk unit.

11. The invention defined in claim 7 wherein said temperature controlling means includes means for heating the record element of said disk unit.

12. The invention defined in claim 7 wherein said temperature controlling means includes means for cooling the cover sheet of said disk unit.

13. A method of recording upon an optical disk unit of the kind including: (i) a record element having an ablatable record portion and (ii) a cover sheet mounted in spaced relation to the record portion in a manner forming a generally enclosed space between the record element and cover sheet, said method comprising:
    (a) rotating such disk unit;

(b) optically forming ablated markings on the record portion of such rotating disk unit; and (c) controlling the temperature of the record element and/or the cover sheet of a received disk unit so that thermophoretic forces drive ablative debris particles in the record element/cover sheet inter-space toward the cover sheet.

14. The invention defined in claim 13 wherein said temperature controlling step comprises effecting a temperature gradient of at least about 50° C./mm across the cover sheet/record element inter-space.

15. The invention defined in claim 14 wherein said temperature controlling step includes heating the record element of such disk unit.

16. The invention defined in claim 14 wherein said temperature controlling step includes cooling the cover sheet of such disk unit.

17. The invention defined in claim 13 wherein said temperature controlling step includes heating the record element of such disk unit.

18. The invention defined in claim 13 wherein said temperature controlling step includes cooling the cover sheet of such disk unit.

19. An optical disk recording system comprising a turntable, optical means for focusing a recording light spot onto a disk unit record portion, a radiant energy source for uniformly heating the record layer of a disk unit on the turntable, a sealed optical disk unit comprising a support bearing a record layer, said support being highly absorptive to such radiant energy and in conductive heat transfer relation with said record layer.

* * * * *